(12) United States Patent
Lake et al.

(10) Patent No.: US 7,920,343 B2
(45) Date of Patent: Apr. 5, 2011

(54) METHOD OF FORMING LENS ARRAYS AND TRANSFERRING SUCH ONTO MOVABLE-MEMS STRUCTURES

(75) Inventors: Rick Lake, Meridian, ID (US); Ulrich Boettiger, Boise, ID (US); Shashikant Hegde, Boise, ID (US); Jacques Duparre, Jena (DE)

(73) Assignee: Aptina Imaging Corporation, George Town (KY)

( * ) Notice: Subject to any disclaimer, the term of this patent is extended or adjusted under 35 U.S.C. 154(b) by 248 days.

(21) Appl. No.: 12/353,807

(22) Filed: Jan. 14, 2009

(65) Prior Publication Data

US 2010/0177408 A1    Jul. 15, 2010

(51) Int. Cl.
*G02B 7/02*    (2006.01)
(52) U.S. Cl. .................. 359/819; 359/619
(58) Field of Classification Search .......... 359/811, 359/819, 822, 619, 315, 355; 385/14, 31, 385/33; 372/38.1, 103; 398/56; 348/340, 348/351, 374; 438/57, 65, 69, 70; 257/432; 264/1.1, 1.32
See application file for complete search history.

(56) References Cited

U.S. PATENT DOCUMENTS

| | | | |
|---|---|---|---|
| 6,636,653 B2 | 10/2003 | Miracky et al. | |
| 6,914,635 B2* | 7/2005 | Ostergard | 348/374 |
| 7,086,134 B2* | 8/2006 | Dautartas et al. | 29/464 |
| 7,242,541 B2 | 7/2007 | Araki | |
| 7,280,290 B2 | 10/2007 | Araki et al. | |
| 7,290,321 B2* | 11/2007 | Steinberg et al. | 29/464 |
| 7,295,375 B2* | 11/2007 | Jacobowitz et al. | 359/619 |
| 7,324,716 B2* | 1/2008 | Epitaux | 385/14 |
| 7,446,942 B2* | 11/2008 | Jacobowitz et al. | 359/619 |
| 7,645,628 B2* | 1/2010 | Perkins | 438/57 |
| 2010/0123209 A1* | 5/2010 | Duparre et al. | 257/432 |
| 2010/0177411 A1* | 7/2010 | Hegde et al. | 359/823 |

* cited by examiner

*Primary Examiner* — Loha Ben

(57) ABSTRACT

Micro-electrical-mechanical (MEMS) wafers in which a lens is formed on a micro-electrical-mechanical structure. The micro-electrical-mechanical wafers can comprise a substrate, MEMS structures, and a lens array. A method of forming a micro-electrical-mechanical wafer comprises providing a substrate, forming a micro-electrical-mechanical structure on the substrate, forming a carrier, forming a lens array on the carrier, and transferring the lens array from the carrier onto the micro-electrical-mechanical structure. The lens array is placed above the micro-electrical-mechanical structure.

34 Claims, 9 Drawing Sheets

METHOD OF FORMING LENS ARRAYS AND TRANSFERRING SUCH ONTO MOVABLE-MEMS STRUCTURES

FIELD OF THE INVENTION

Embodiments described herein relate generally to processes of forming lens wafers for use in imaging devices, and more particularly to processes of forming lenses on structures incorporating micro-electrical-mechanical systems (MEMS) technology.

BACKGROUND OF THE INVENTION

Microelectronic imaging devices are used in a multitude of electronic devices. As microelectronic imaging devices have decreased in size and improvements have been made with respect to image quality and resolution, they are now commonly found in electronic devices including mobile telephones and personal digital assistants (PDAs) in addition to their traditional uses in digital cameras.

Microelectronic imaging devices include image sensors that typically are charged coupled device (CCD) systems or complementary metal-oxide semiconductor (CMOS) systems, as well as other imaging technologies. The lenses for these microelectronic imaging devices may require mobility for operations such as automatic focus or zoom features. To meet the increased need for smaller lenses with retained mobility, MEMS structures have been incorporated into lens stacks. For example, MEMS wafers may be integrated with lenses to be used as, e.g., an automatic focus (autofocus) or zoom system by accurately changing the relative distance of the lenses with respect to each other and/or a pixel array.

MEMS is a relatively new technology that exploits the existing microelectronics infrastructure to create complex machines with micron feature sizes. MEMS structures have been created for lens movement and may be integrated with lenses. Some examples of MEMS structures which my be used for lens movement may be found in U.S. Pat. Nos. 6,636,653, 7,242,541 and 7,280,290.

Lens replication for imaging devices may be carried out on a glass wafer using an ultra-violet (UV) curable optical polymer and a compression stamp or mold. Processes for manufacturing imaging devices which include lens structures and MEMS structures for moving the lens structures can be expensive because the MEMS structures and lenses are created in separated processes, and then attached together in a subsequent process. Bulky mechanical packaging is another problem experienced with the lens/MEMS structure combination. There is a need for a more efficient, less bulky and less expensive method of forming lenses which are integrated with MEMS structures.

DETAILED DESCRIPTION OF THE INVENTION

Figure 1:
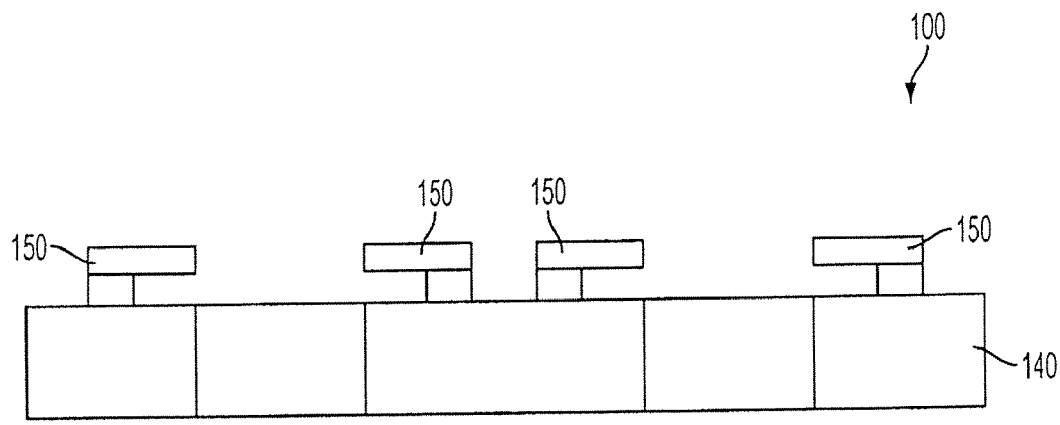
FIG. 1 shows a MEMS wafer at a stage of manufacturing according to an embodiment described herein.

In the following description, reference is made to the accompanying drawings which form a part hereof, and in which are shown by way of illustrations specific embodiments that may be practiced. It should be understood that like reference numerals represent like elements throughout the drawings. These example embodiments are described in sufficient detail to enable those skilled in the art to practice them. It is to be understood that other embodiments may be utilized, and that structural, material and electrical changes may be made, only some of which are discussed in detail below, without departing from the spirit and scope of the invention.

Embodiments described herein relate to a method of forming a lens wafer by forming lenses on the wafer and attaching them in aligned fashion to a wafer containing MEMS structures which eliminates the need for bulky mechanical packaging. The combined lenses/MEMS structure can then in turn be integrated with an imager wafer to form an imaging device. The embodiments described herein provide arrays of lenses that can be attached to arrays of movable MEMS structures for autofocus and/or zoom applications, and a means to transfer and attach the lens array to the MEMS structure array.

FIG. 1 shows a portion of a MEMS wafer 100 at a first stage of manufacture. MEMS structures 150 are formed on a substrate 140. The MEMS structures 150 are formed on the surface of the substrate 140 by any suitable method such as, for example, surface micro-machining (described below), bulk micromaching, and LIGA (meaning Lithographie, Galvanoformung, Abformung (and variations thereof)) the substrate 140. The MEMS structures 150 may be, for example, piezoelectric, electrostatic or magnetostatic MEMS structures, and may incorporate features such as hinges or actuators. The substrate 140 may be comprised of a silicon glass (e.g., Borofloat® 33 manufactured by Schott AG, Germany) or any other suitable material.

Surface micromachining is accomplished by three basic techniques: deposition of thin films; wet chemical etching; and dry etching techniques. The most common form of dry etching for micromachining applications is reactive ion etching (RIE). Ions are accelerated towards the material to be etched, and the etching reaction is enhanced in the direction of travel of the ion. RIE is an anisotropic etching technique. Trenches and pits many microns deep of arbitrary shape and with vertical sidewalls can be etched by prior art techniques in a variety of materials, including silicon, oxide, and nitride. RIE is not limited by the crystal planes of polysilicon. Dry etching techniques can be combined with wet etching to form various micro devices. "V" shaped grooves or pits with tapered sidewalls can be formed in silicon by anisotropic etching with KOH etchant. Another etching technique, with roots in semiconductor processing, utilizes plasma etching.

Figure 2:
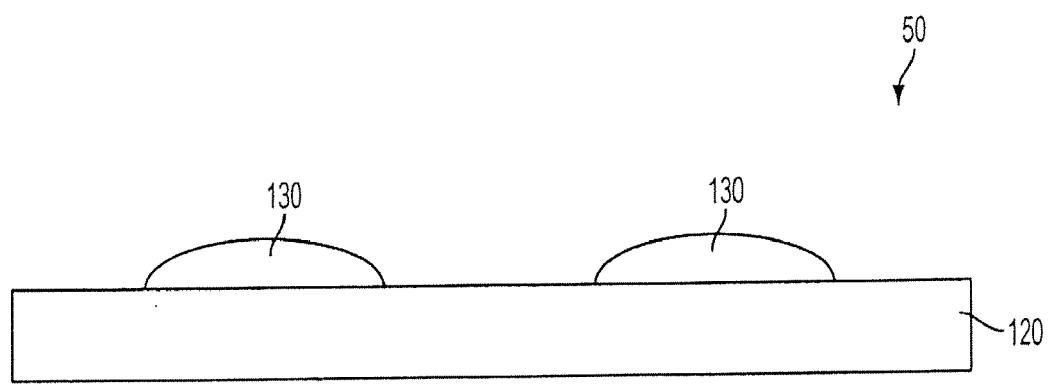
FIG. 2 shows a lens array at a stage of manufacturing according to an embodiment described herein.
Figure 3A:
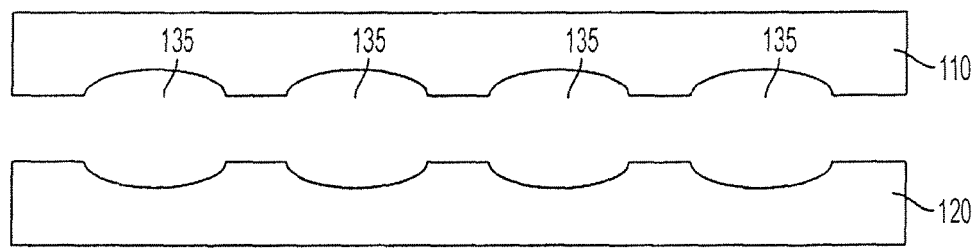
FIG. 3A shows a lens wafer at a stage of manufacturing according to an embodiment described herein.

Referring to FIG. 2, in a step separate from that described in FIG. 1, a lens array 50 is also formed. The illustrated step creates lenses 130 on a temporary carrier 120. The lenses 130 may be formed by any suitable method of lens replication. One suitable method uses a temporary carrier 110 (FIG. 3A) (upper mold). Both temporary carriers 110, 120 may be comprised of, for example, silicon, polymer, glass or polymer-on-glass. Temporary carrier 120 is designed to support only the formed lenses 130. It should be appreciated that the temporary carriers 110, 120 can be made of the same material or different materials. The temporary carriers 110, 120 may be made from a soluble material (e.g., a water soluble material such as a polymer or wax). In some embodiments, the soluble temporary carrier 110 can be dissolved away (as described below), leaving the lenses 130 on the non-soluble temporary carrier 120.

Figure 3B:
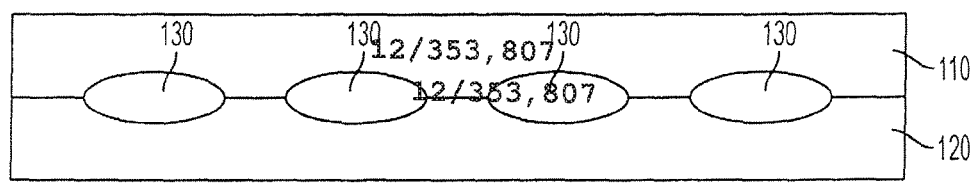
FIG. 3B shows a lens wafer at a stage of manufacturing according to an embodiment described herein.
Figure 3C:
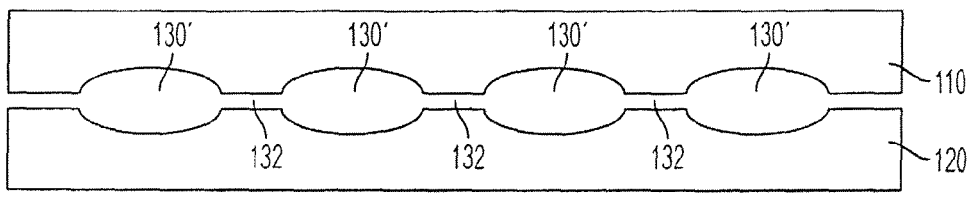
FIG. 3C shows a lens wafer at a stage of manufacturing according to an embodiment described herein.

As shown in FIGS. 3B and 3C, in one embodiment, the lenses 130 may be formed of ultra-violet curable material by selective ultra-violet replication. The ultra-violet curable material may be puddle dispensed or may be applied as a layer onto temporary carrier 120. Temporary carrier 110 has a lens mold cavity 135 that is brought into increasingly closer contact with the material until the material flows out to the desired diameter and fills the entire lens mold cavity 135. The ultraviolet curable material may then be cured to form the lenses 130 and the uncured material between lenses 130 may be removed. In another embodiment, discrete drops of ultra-violet curable polymer are formed on temporary carrier 120 and then stamped with a lens stamp to form the lenses 130. It should also be appreciated that in a modified embodiment a polymer layer 132 can remain between lenses 130 to form lens structure 130' along the temporary carrier 120, as shown in FIG. 3C.

While the lenses 130 shown in the embodiments of FIGS. 2-3C are convex, it should be understood that concave or partially convex/concave lenses may also be formed. The lenses 130 may be formed of a rigid material (e.g., an Ormocer® such as Ormocomp®, manufactured by Microresist Technology GmbH, Berlin, Germany) or a flexible material (e.g., polydimethylsiloxane ("PDMS")). When the lenses 130 are formed of rigid material, the movement of the lenses 130 are restricted to axial or lateral movement by the MEMS structures 150 (FIG. 1). When the lenses 130 are formed of a flexible material, the shape of the lens itself may be changed by the MEMS structures 150 by stretching or otherwise distorting the lenses 130. Lens material can vary along the lens radius by, e.g., strong electromagnetic or particle radiation during fabrication, to influence the mechanical properties of the lens. As shown in FIG. 2, once the lenses 130 are formed, one of the carriers 110, 120 may be etched or dissolved from one side of the lenses 130 to expose the lenses 130. In the embodiment illustrated in FIG. 2, the upper mold formed by temporary carrier 110 has been etched/dissolved away. Preferably, the upper mold (temporary carrier 110) is removed from one side of the lenses 130.

Figure 3D:
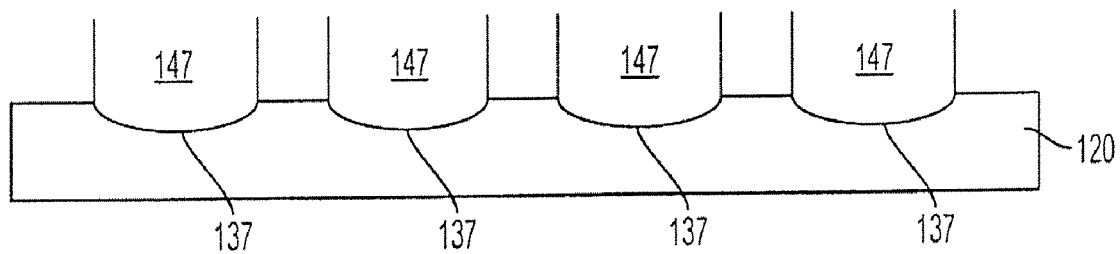
FIG. 3D shows a lens wafer at a stage of manufacturing according to an embodiment described herein.

Another example embodiment of a method of forming the lenses 130 comprises embossing a depression 137 into the temporary carrier 120 using a lens stamp 147 (FIG. 3D). In one embodiment, the temporary carrier 120 may be embossed using a hot embossing method and may be formed of a material suitable for such a method, such as polycarbonate. In another embodiment, the temporary carrier may be an ultra-violet curable material and may be embossed by a standard ultra-violet embossing process.

Figure 4A:
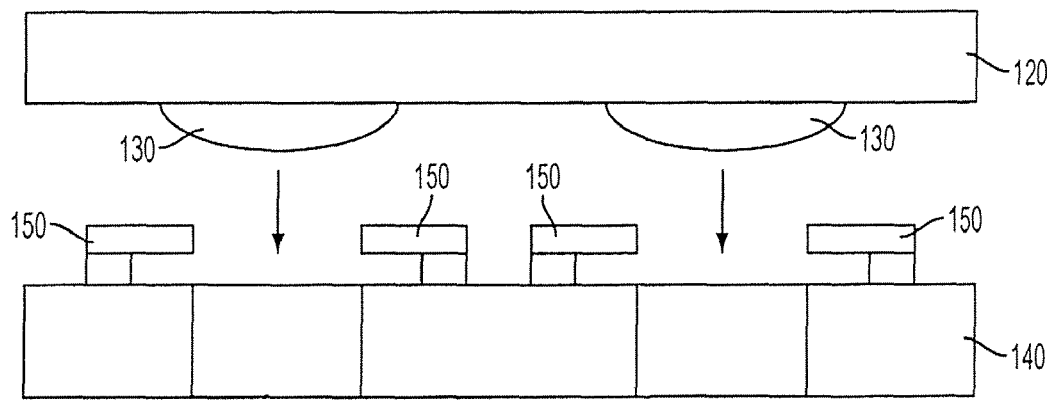
FIG. 4A shows a MEMS-lens wafer at a stage of manufacturing according to an embodiment described herein.

Once the lenses 130 are formed, for example as shown in FIG. 2, using any suitable method described above, and referring to FIGS. 4A and 4B, the lenses 130 on the remaining temporary carrier 120 are transferred from the carrier 120 to the MEMS structures 150 and the substrate 140. In transferring, the temporary carrier 120 and lenses 130 are attached (via bonding or any other suitable method) to the MEMS structure 150 (see FIG. 4A) and temporary carrier 120 is removed as described below (see FIG. 4B). It should be appreciated that an array of lenses 130 can be aligned and bonded or otherwise transferred and attached to the MEMS structure 150.

Figure 4B:
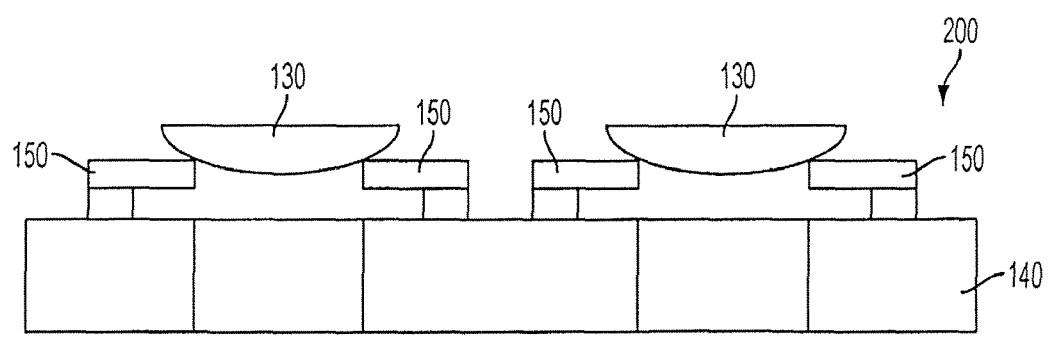
FIG. 4B shows a MEMS-lens wafer at a stage of manufacturing according to the embodiment described herein.

As illustrated in FIG. 4B, the temporary carrier 120 is removed, leaving the lenses 130 on the MEMS structures 150. The temporary carrier 120 may be removed by etching by any suitable method (e.g., reactive ion etching, dry etching and KOH) or may be dissolved by any suitable method (e.g., water, polyvinyl alcohol or isopropyl alcohol). The temporary carrier 120 may be completely dissolved to leave the lenses 130 attached to the MEMS structures 150, or in an alternative embodiment, the carrier 120 is not temporary and can be transparent and not removed.

Figure 5:
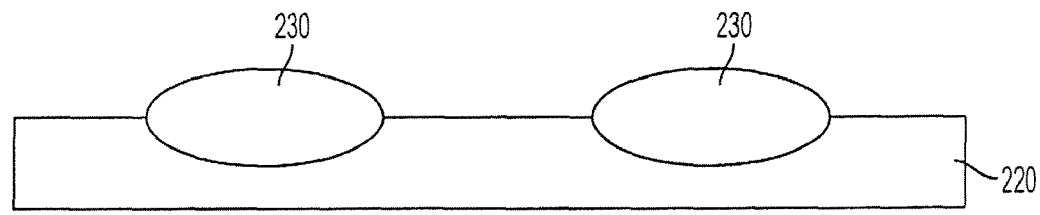
FIG. 5 shows a lens array at a stage of manufacturing according to an embodiment described herein.
Figure 6A:
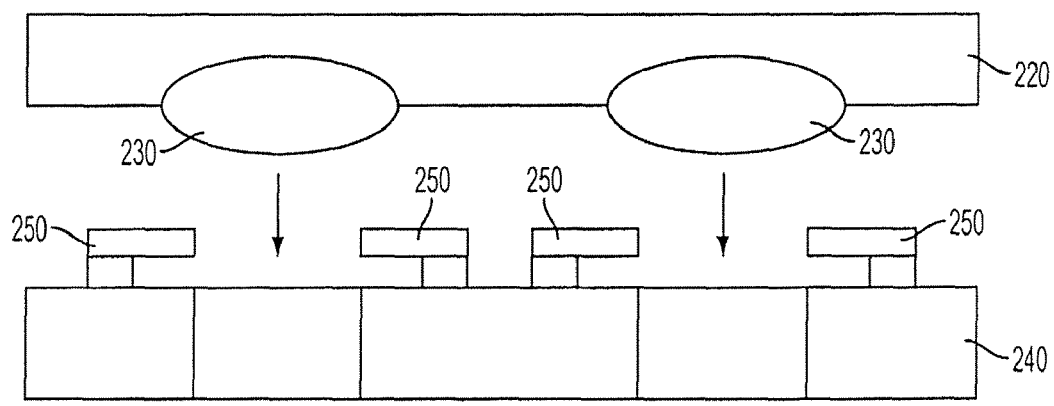
FIG. 6A shows a MEMS-lens wafer at a stage of manufacturing according to an embodiment described herein.

FIG. 5 shows another lens 230 array structure on a carrier 220. It should be appreciated that FIGS. 2 and 5 differ only in the shape of the formed lenses 130, 230. FIG. 2 illustrates lenses 130 having a flat side which face away from the substrate 140 when the lenses 130 are mounted to the MEMS structures 150 and a convex-shaped side facing towards the substrate 140. FIG. 5 illustrates lenses 230 having a convex-shaped side facing away from the substrate 240 (FIG. 6A) and a convex-shaped side facing towards the substrate 240 (FIG. 6A).

Figure 6B:
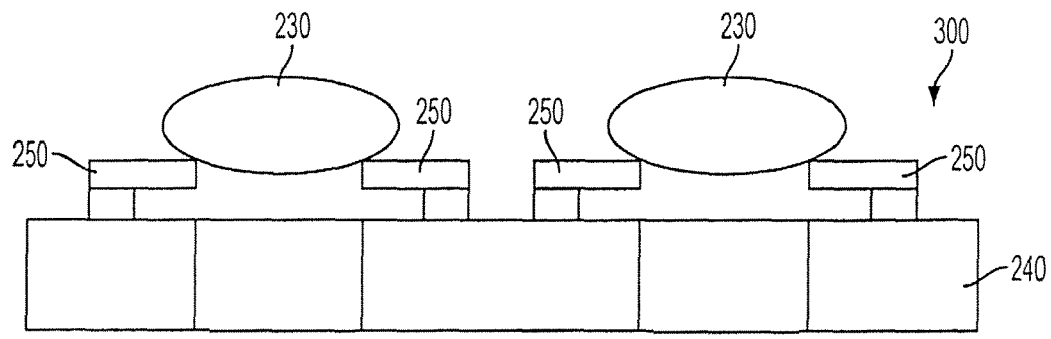
FIG. 6B shows a MEMS-lens wafer at a stage of manufacturing according to the embodiment described herein.

Thus, similarly, once the FIG. 5 lenses 230 are formed using any suitable method described above, and referring to FIGS. 6A and 6B, the lenses 230 on the remaining temporary carrier 220 are transferred from the temporary carrier 220 to the MEMS structures 250 and the substrate 240. In transferring, the temporary carrier 220 and lenses 230 are attached to the MEMS structure 250 (FIG. 6A) and then temporary carrier 220 is removed (FIG. 6B). It should be appreciated that an array of lenses 230 can be aligned and bonded or otherwise transferred and attached to respective MEMS structures 250.

As illustrated in FIG. 6B, the temporary carrier 220 is removed, leaving the lenses 230 on the MEMS structures 250. The temporary carrier 220 may be removed by etching using any suitable method or it may be dissolved using any suitable method. The temporary carrier 220 may be completely dissolved to leave the lenses 230 attached to the MEMS structures 250, or in an alternative embodiment, the carrier 220 would be transparent, not removed and thus, permanent.

Another alternative temporary carrier embodiment would be for both temporary carriers (upper and lower molds) 110, 120, 220 to be soluble, but not with the same solute. For example, carrier 110 could be dissolved with water (e.g., polycarbonate, polyvinyl alcohol, etc.) while carrier 120 is not water soluble, but solvent soluble (e.g., polynorborene) instead. Also, some materials such as soluble waxes can be used that are soluble in warm water, but not in cool water that is below a certain temperature. In this embodiment, both temporary carriers 110, 120 can be water soluble, however, one (e.g., temporary carrier 110) can be formed of a material capable of being dissolved with cool water (e.g., PVA), which will not affect the other carrier (e.g., temporary carrier 120). Then, when the lower mold is ready for removal, it can be dissolved using hot water (e.g., wax), leaving the lenses 130 in place on the MEMS structure 150. Another approach is to use a UV releasable material in the temporary carrier 120. Using this approach, the temporary carrier 120 will release from the lenses 130 when exposed to UV radiation.

It should be appreciated that the MEMS structures 150, 250 shown in FIGS. 4B and 6B, respectively, are intended to be representative of any appropriate MEMS structure implementation and are, therefore, not intended to be limiting. In addition, the size and shapes of lenses 130, 230 shown in FIGS. 4B and 6B, respectively, are only intended to be representative, and lenses of any size and shape may be formed by any of the methods of forming lens structures.

Figure 7A:
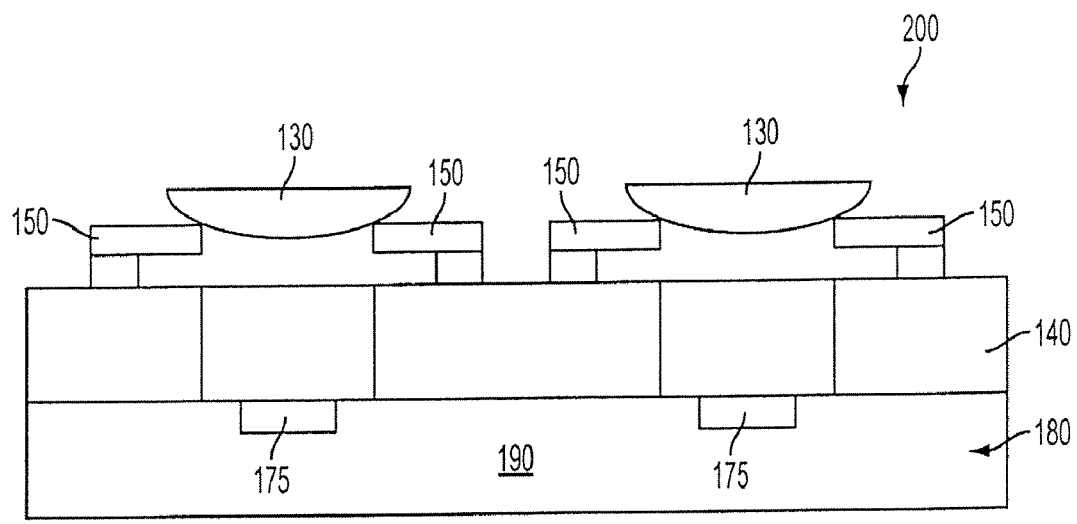
FIG. 7A shows a lens wafer combined with an imager wafer to form an imaging device according to an embodiment described herein.
Figure 8:
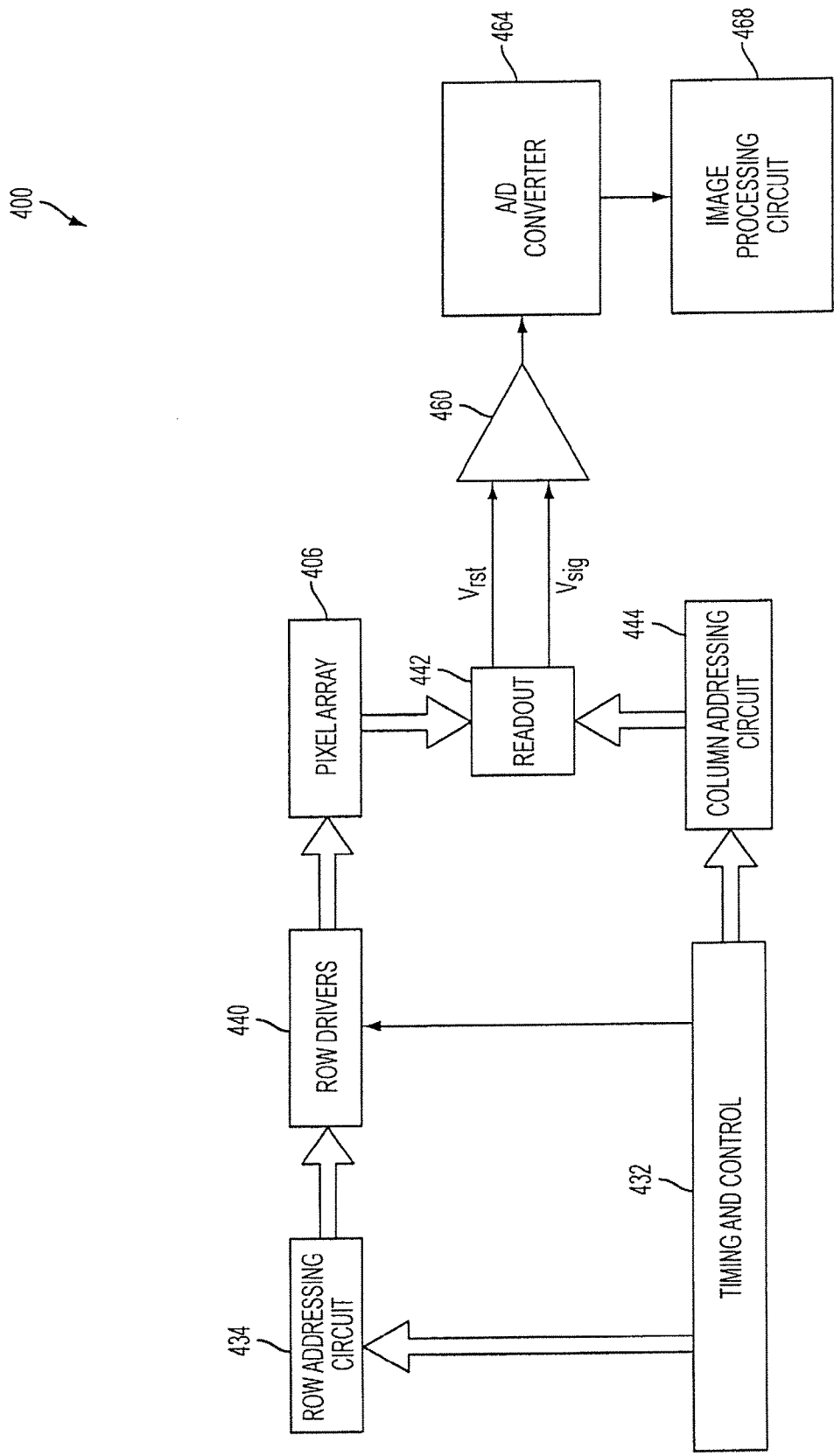
FIG. 8 is a illustrates a block diagram of a CMOS imaging device constructed in accordance with an embodiment described herein.

As shown in FIG. 7A, the completed MEMS wafer 200 may be combined with an imager wafer 180 containing a plurality of pixel arrays 175 and associated imager circuitry by aligning a pixel array 175 on the substrate 190 of the imager wafer 180 with the lens 130 of the MEMS wafer 200 or other known wafer package to provide an imaging device 400 (shown in FIG. 8). It should also be appreciated the MEMS wafer 200 may be diced and combined with an image sensor on chip-level.

Figure 7B:
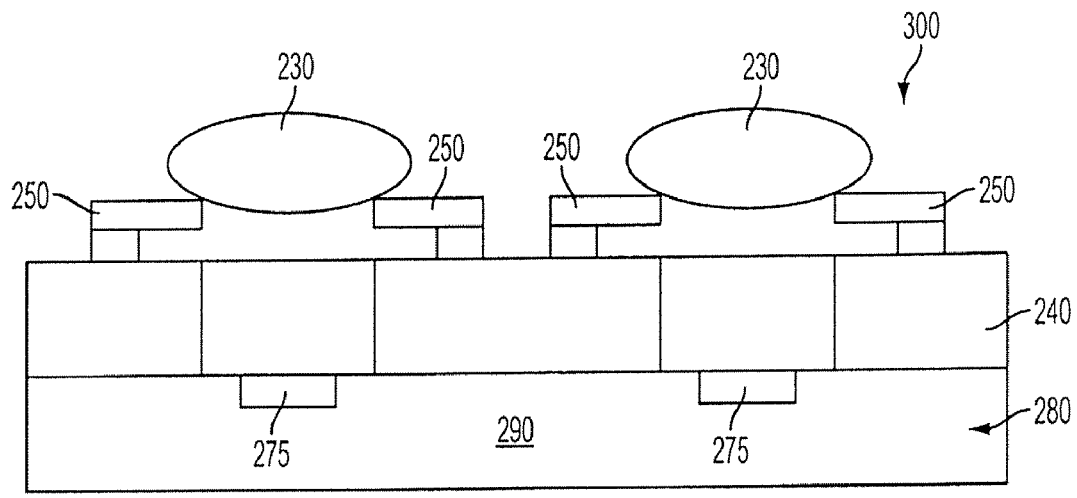
FIG. 7B shows a lens wafer combined with an imager wafer to form an imaging device according to another embodiment described herein.

Alternatively, as shown in FIG. 7B, the completed MEMS wafer 300 may be combined with an imager wafer 280 by aligning a pixel array 275 on the substrate 290 of the imager wafer 280 with the lens 230 of the MEMS wafer 300 to provide an imaging device 400 (as will be shown and described in regards to FIG. 8).

Figure 7C:
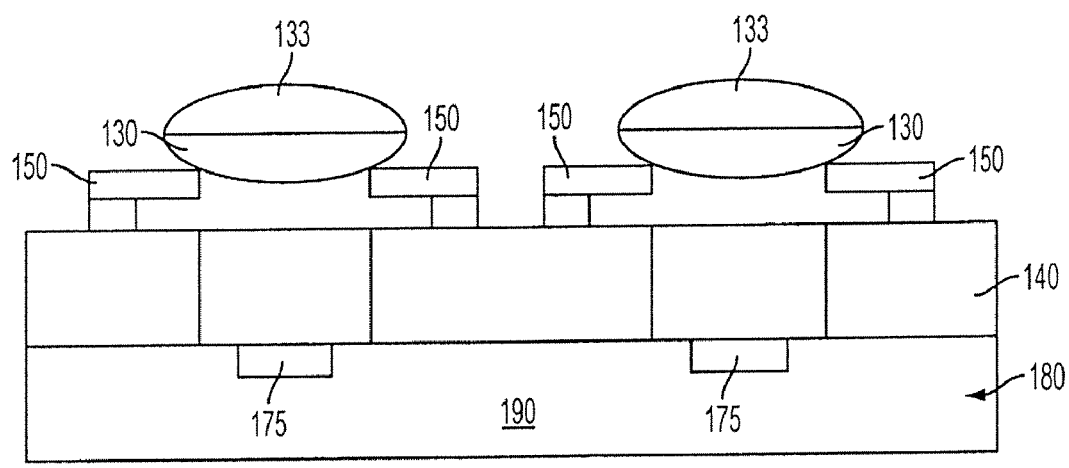
FIG. 7C shows a lens wafer combined with an imager wafer to form an imaging device according to another embodiment described herein.

It should also be appreciated, as shown in FIG. 7C, that a second lens 133 could be molded and transferred in a similar manner (as described above in FIG. 7A) to the first lens 130 or added by direct replication. The lenses 130, 133 may be replicated or molded completely independent and unconnected from each other, or, connected by a continuous or broken discontinuous film of lens material (similar to the discussion above regarding FIGS. 3B and 3C).

FIG. 8 shows a block diagram of an imaging device 400 (e.g. a CMOS imager), that may be used in conjunction with a MEMS wafer 200, 300 according to embodiments described herein. A timing and control circuit 432 provides timing and control signals for enabling the reading out of signals from pixels of the pixel array 406 in a manner commonly known to those skilled in the art. The pixel array 406 has dimensions of M rows by N columns of pixels, with the size of the pixel array 406 depending on a particular application.

Signals from the imaging device 400 are typically read out a row at a time using a column parallel readout architecture. The timing and control circuit 432 selects a particular row of pixels in the pixel array 406 by controlling the operation of a row addressing circuit 434 and row drivers 440. Signals stored in the selected row of pixels are provided to a readout circuit 442. The signals are read from each of the columns of the array sequentially or in parallel using a column addressing circuit 444. The pixel signals, which include a pixel reset signal $V_{rst}$ and image pixel signal $V_{sig}$, are provided as outputs of the readout circuit 442, and are typically subtracted in a differential amplifier 460 with the result digitized by an analog-to-digital (A/D) converter 464 to provide digital pixel signals. The digital pixel signals represent an image captured by an example pixel array 406 and are processed in an image processing circuit 468 to provide an output image.

Figure 9:
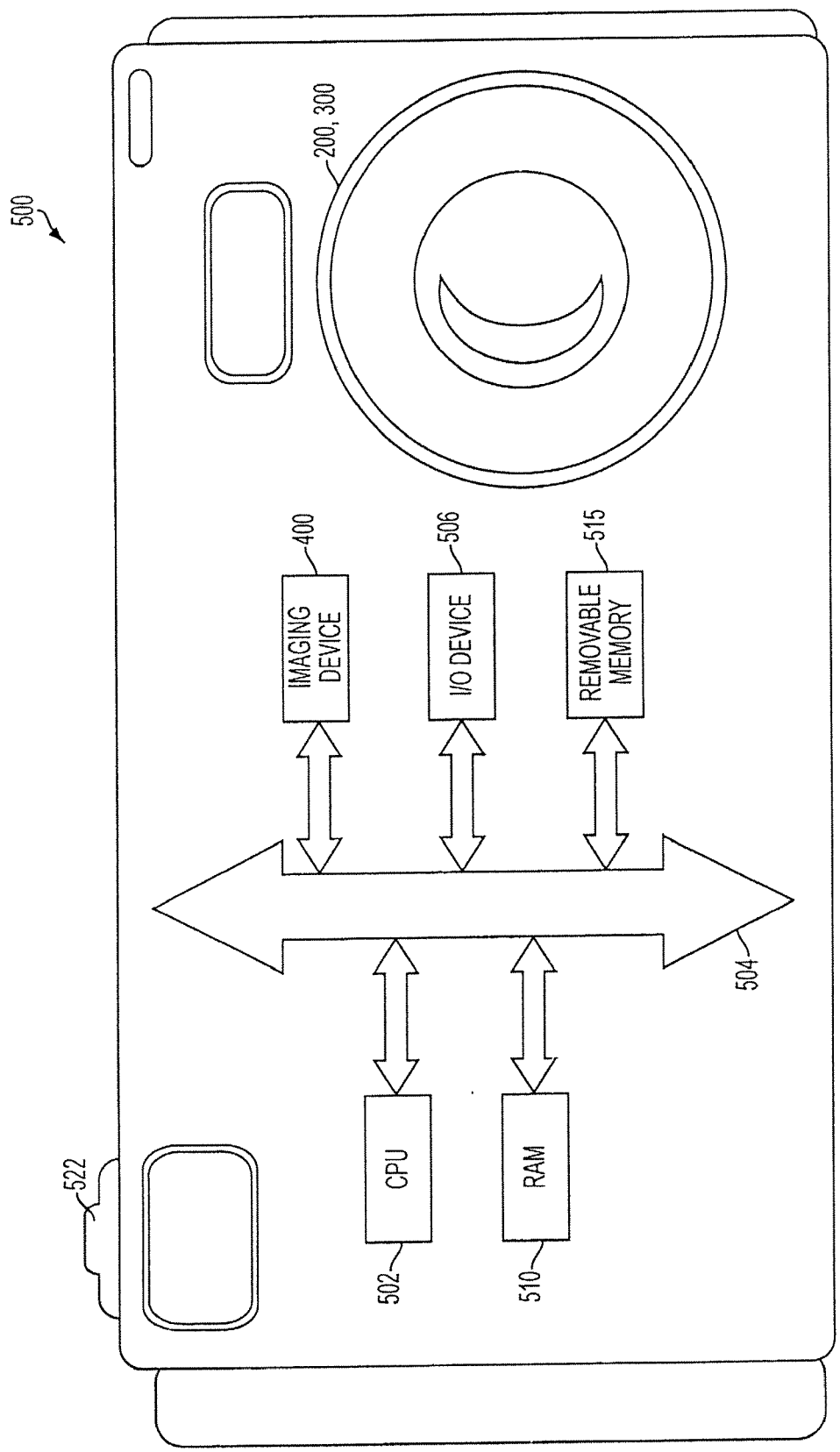
FIG. 9 shows a system constructed in accordance with an embodiment described herein.

FIG. 9 shows a system 500 that includes an imaging device 400 and a MEMS wafer 200, 300 constructed in accordance with the various embodiments described above. The system 500 is a system having digital circuits that include imaging device 400. Without being limiting, such a system could include a computer system, camera system, scanner, machine vision, vehicle navigation, video telephone, surveillance system, autofocus system, star tracker system, motion detection system, image stabilization system, or other image acquisition system.

System 500, e.g., a digital still or video camera system, generally comprises a central processing unit (CPU) 502, such as a control circuit or microprocessor for conducting camera functions that communicates with one or more input/output (I/O) devices 506 over a bus 504 and for controlling the MEMS structures that adjust the distance of the lens from the pixel array. Imaging device 400 also communicates with the CPU 502 over the bus 504. The processor system 500 also includes random access memory (RAM) 510, and can include removable memory 515, such as flash memory, which also communicates with the CPU 502 over the bus 504. The imaging device 400 may be combined with the CPU processor with or without memory storage on a single integrated circuit or on a different chip than the CPU processor. In a camera system, a MEMS wafer 200, 300 according to various embodiments described herein may be used to focus image light onto the pixel array 406 of the imaging device 400 and an image is captured when a shutter release button 522 is pressed.

While embodiments have been described in detail in connection with the embodiments known at the time, it should be readily understood that the claimed invention is not limited to the disclosed embodiments. Rather, the embodiments can be modified to incorporate any number of variations, alterations, substitutions or equivalent arrangements not heretofore described. For example, while some embodiments are described in connection with a CMOS pixel imaging device, they can be practiced with any other type of imaging device (e.g., CCD, etc.) employing a pixel array or a camera using film instead of a pixel array. Also, although the embodiments depicted herein show multiple MEMS and lenses arranged on each substrate, it should be understood that in practice either many MEMS and lenses (tens, hundreds, or thousands) may be formed at the same time on each substrate, or a single MEMS and lens may be formed at the same time on each substrate. Accordingly, the claimed invention is not limited by the embodiments described herein but is only limited by the scope of the appended claims.

What is claimed as new and desired to be protected by Letters Patent of the United States is:

1. An apparatus comprising:
    a micro-electrical-mechanical wafer, the micro-electrical-mechanical wafer having a micro-electrical-mechanical structure formed above a substrate; and
    a lens array wafer, the lens array wafer having a lens array and a temporary carrier, the lens array wafer being coupled to the micro-electrical-mechanical wafer, wherein, once the lens array wafer is coupled to the micro-electrical-mechanical wafer, the lens array is attached to the micro-electrical-mechanical wafer.

2. The apparatus of claim 1, wherein the lens array comprises a lens having a convex side facing away from the substrate and a second convex side facing towards the substrate.

3. The apparatus of claim 1, wherein the lens array comprises a lens having a flat side facing away from the substrate and a convex side facing towards the substrate.

4. The apparatus of claim 1, wherein the lens array comprises an ultra-violet curable material.

5. The apparatus of claim 1, wherein the carrier is a dissolvable polymer material.

6. The apparatus of claim 1, wherein the carrier is a water soluble material.

7. The apparatus of claim 1, wherein the carrier is a transparent substrate.

8. An imaging structure comprising:
   a micro-electrical-mechanical apparatus wafer comprising:
      a plurality of micro-electrical-mechanical structures; and
      a lens array wafer, the lens array wafer having a lens array and being coupled to the plurality of micro-electrical-mechanical structures; and
   an imager wafer coupled to the lens array wafer and comprising a pixel array, the pixel array being aligned with the lens array, and associated circuitry, wherein, once the lens array wafer is coupled to the plurality of micro-electrical-mechanical wafer, the lens array is bonded to the micro-electrical-mechanical wafer.

9. The imaging structure of claim 8, wherein the plurality of micro-electrical-mechanical structures are capable of adjusting a distance of the lens array from the pixel array.

10. The imaging structure of claim 8, wherein the lens array comprises an ultra-violet curable material.

11. The imaging structure of claim 8, wherein the lens array comprises a rigid material.

12. The imaging structure of claim 8, wherein the lens array wafer comprises a carrier coupled to the lens array.

13. The imaging structure of claim 12, wherein the carrier is a transparent substrate.

14. A method of forming a micro-electrical-mechanical wafer, the method comprising:
   forming a plurality of micro-electrical-mechanical structures on a substrate;
   forming a plurality of lens arrays on a carrier; and
   transferring the lens arrays from the carrier onto the plurality of micro-electrical-mechanical structures.

15. The method of claim 14, wherein the step of transferring the lens arrays comprises placing the carrier above the plurality of micro-electrical-mechanical structures in a position such that the lens arrays are coupled to the plurality of micro-electrical mechanical structures.

16. The method of claim 15, further comprising the step of etching away the carrier from above the lens arrays.

17. The method of claim 15, further comprising the step of dissolving away the carrier from above the lens arrays.

18. The method of claim 14, wherein the step of forming the lens arrays comprises selective ultra-violet replication using a stamp.

19. The method of claim 14, wherein the step of forming the lens arrays comprises lens replication.

20. The method of claim 14, wherein the step of forming the lens arrays comprises embossing a depression into the carrier using a stamp.

21. A method of forming a wafer structure, the method comprising:
   forming a plurality of micro-electrical-mechanical structures on a substrate;
   forming a lens array on a temporary carrier; and
   placing the lens array and the carrier onto the plurality of micro electrical-mechanical structures, wherein the lens array is placed above the plurality of micro-electrical-mechanical structures.

22. The method of claim 21, further comprising the step of removing the carrier from the lens array.

23. The method of claim 22, wherein the step of removing the carrier from the lens array comprises etching back the carrier.

24. The method of claim 22, wherein the step of removing the carrier from the lens array comprises dissolving the carrier.

25. A method of forming a micro-electrical-mechanical device, the method comprising:
   forming a plurality of micro-electrical-mechanical structures on a substrate;
   separately, forming a lens array on a carrier; and
   transferring the lens array from the carrier onto the plurality of micro-electrical-mechanical structures; and
   bonding the transferred lens array to the plurality of micro-electrical-mechanical structures.

26. The method of claim 25, wherein the step of transferring the lens array comprises placing the carrier above the plurality of micro-electrical-mechanical structures in a position such that the lens array is coupled to the plurality of micro-electrical-mechanical structures.

27. The method of claim 26, further comprising removing the carrier from above the lens array.

28. The method of claim 27, wherein the step of removing the carrier comprises etching away the carrier from above the lens array.

29. The method of claim 27, wherein the step of removing the carrier comprises dissolving away the carrier from above the lens array.

30. The method of claim 27, further comprising forming another lens surface onto the formed lens array.

31. The method of claim 26, wherein the step of forming the lens array comprises selective ultra-violet replication.

32. The method of claim 26, wherein the step of forming the lens array comprises lens replication.

33. The method of claim 26, wherein the step of forming the lens array comprises embossing a depression into the carrier using a stamp.

34. The method of claim 26, further comprising forming an imager wafer coupled to the substrate on a surface opposite the plurality of micro electrical-mechanical structures and comprising a pixel array, the pixel array being aligned with the lens array.

* * * * *